United States Patent
Golovchinsky et al.

[19]

[11] Patent Number: 6,128,634
[45] Date of Patent: Oct. 3, 2000

[54] METHOD AND APPARATUS FOR FACILITATING SKIMMING OF TEXT

[75] Inventors: Gene Golovchinsky; William Noah Schlitt; Morgan N. Price, all of Palo Alto, Calif.

[73] Assignees: Fuji Xerox Co., LTD., Tokyo, Japan; Xerox Corporation, Stamford, Conn.

[21] Appl. No.: 09/003,520

[22] Filed: Jan. 6, 1998

[51] Int. Cl.[7] .............................. G06F 17/30; G06F 17/00
[52] U.S. Cl. .............................................. 707/526; 707/3
[58] Field of Search .................................... 707/3–5, 500, 707/515, 526–531, 513, 532; 345/116, 141, 336–339, 341, 345–347

[56] References Cited

U.S. PATENT DOCUMENTS

| | | | |
|---|---|---|---|
| 5,642,520 | 6/1997 | Takeshita et al. | 707/531 |
| 5,692,176 | 11/1997 | Holt et al. | 707/5 |
| 5,926,811 | 7/1999 | Miller et al. | 707/5 |
| 5,963,940 | 10/1999 | Liddy et al. | 707/5 |
| 5,987,460 | 11/1999 | Niwa et al. | 707/6 |

OTHER PUBLICATIONS

Golovchinsky, Gene. "Queries? Links? Is There a Difference?" *Proceedings of CHI '97*, Mar. 1997, Atlanta, Ga., ACM Press.

Golovchinsky, Gene. "What the Query Told the Link: The Integration of Hypertext and Information Retrieval." *Proceedings of Hypertext '97*, Apr. 1997, South Hampton, U.K., ACM Press.

Kupiec, Julian et al. "A Trainable Document Summarizer." *Proceedings of SIGIR '95*, Jul. 1995, Pittsburgh, PA, ACM Press.

O'Donnel, Mick. "Variable Length On–Line Document Generation." *Proceedings of the Sixth European Workshop on Natural Language Generation*, Mar. 1997, Duisburg, Germany.

Remde, Joel R. et al. "SuperBook: An Automatic Tool for Information Exploration—Hypertext?" *Proceedings of Hypertext '87*, Nov. 1987, Chapel Hill, N.C., ACM Press.

Salton, Gerard et al. "Automatic Analysis, Theme Generation, and Summarization of Machine–Readable Texts." *Science*, vol. 264, Jun. 3, 1994, pp. 1421–1426.

Salton, Gerard. "Automatic Text Processing." Reading, Massachusetts: Addison–Wesley Publishing Company, Inc., 1989, pp. 303–309.

*Primary Examiner*—Joseph H. Feild
*Assistant Examiner*—Alford W. Kindred
*Attorney, Agent, or Firm*—Oliff & Berridge, PLC

[57] ABSTRACT

The electronic document reading and skimming system presents a document using a variable emphasis attribute. The emphasis varies based on a degree with which each term in the document represents the overall content of the document or the user's interest with respect to that document. The system and method of this invention calculates a score for each term that reflects the degree to which each term represents the overall content of the document, maps the scores to a variable emphasis attribute of a presentation system and then presents the document in accordance with the mapped scores.

28 Claims, 4 Drawing Sheets

METHOD AND APPARATUS FOR FACILITATING SKIMMING OF TEXT

BACKGROUND OF THE INVENTION

1. Field of Invention

This invention is directed to an electronic document reading and skimming system. In particular, this invention is directed to a system that permits a person to rapidly and accurately skim a document to determine the relevance of the document. More specifically, this invention is directed to an electronic document reading and skimming system that varies emphasis attributes to present terms in a document in accordance with the degree with which the terms represent the content of the document.

2. Description of Related Art

Before a person decides to devote a significant amount of time reading a document, the reader tends to skim through the document to decide whether it is worth spending the time to read the entire document. Readers tend to quickly skim material to find terms in the text of the document that can give them a general idea of the overall content of the document. Skimming does not involve reading the entire document. Rather, skimming conventionally involves focusing on and reading only certain words in the text. Such a skimming technique is unreliable because the reader, when skimming, must assume that the portions of the text that are read indicate the content of the entire document. However, the read portions may or may not reflect the content of the entire document. If the read portions do not reflect the content of the document, skimming does not provide an accurate overview of the document and the reader may be misled.

Conventional electronic document reading support systems have focused on supporting the reading of documents rather than on the skimming of documents. One electronic reading support technique is called Rapid Sequential Visual Presentation (RSVP). RSVP displays the text one word at a time and rapidly overlays the words of the text onto the same space. RSVP displays all of the words in the text of the document and requires the reader to read all of the text. Therefore, RSVP supports reading rather than skimming. No distinction is made between the words of the text relative to the content of the document.

There are systems that analyze the degree to which each word of a text reflects the overall content of a document. Some of these systems rely upon inverse document frequency (IDF) calculations. IDF is a statistical technique that measures the ability of words to discriminate among documents in a collection. Although inverse document frequency is generally known, it is usually used only for determining document similarity. IDF is a technique that is described in "Introduction to Modern Information Retrieval", G. Salton et al., McGraw-Hill, 1983, incorporated by reference herein in its entirety. IDF is used to identify potential hypertext links in a dynamic hypertext application in a system described in "What the Query Told the Link: The Integration of Hypertext and Information Retrieval", G. Golovchinsky, *Proceedings of Hypertext '97*, April 1997, South Hampton, U.K., ACM Press, incorporated herein by reference in its entirety. In that work, however, the links were either present or absent and no intermediate gradation is available. In addition, the user interface was designed to support interactive browsing rather than skimming.

There are text summarization techniques that emphasize important passages visually. Such text summarization techniques are described, for example, in "Automatic Analysis, Theme Generation, and Summarization of Machine-Readable Text", G. Salton et al. *Science*, 264(3), pp. 1421–1426, June 1994; "A Trainable Document Summarizer", J. Kupiec et al., *Proceedings of SIGIR '95*, July 1995, Pittsburgh, Pa., ACM Press; and "Variable Length On-Line Document Presentation", N. O'Donnell, *Proceedings of the Sixth European Workshop on Natural Language Generation*, March 1997, Duisburg, Germany, incorporated herein by reference in their entireties. However, these systems only provide summaries of the document. Full documents are not available to the users of these systems without additional, cognitively expensive, interface operations. An electronic document reading and skimming system is needed that allows the user to skim the document quickly by skimming for interesting terms, and at the same time, provides the user immediate access to the full text of the document.

Conventional information retrieval interfaces highlight terms that cause a document to be retrieved. Examples of such systems are described in "Super Book: An Automatic Tool for Information Exploration—Hypertext?", J. R. Remde et al., *Proceedings of Hypertext '87*, November 1987, Chapel Hill, N.C., ACM Press and "Queries? Links? Is There A Difference?", G. Golovchinsky, *Proceedings of CHI '97*, March 1997, Atlanta, Ga., ACM Press, incorporated herein by reference in their entireties. These systems highlight the search terms to indicate how the document was retrieved. The highlighted terms do not reflect the entire content of the retrieved document. Typically, these systems provide lists ranked in accordance with the frequency of the occurrence of the search terms within the individual documents. However, these highlighted terms do not necessarily reflect the content of the entire retrieved document.

A useful skimming tool would highlight or emphasize the text which generally reflects the content of an entire document and individual portions of a document. Such a tool would permit the user to rapidly skim the document and read only the more characteristic words of the document. Thus, a tool is needed that supports the skimming of a document by highlighting or emphasizing the terms that reflect the overall content of the document.

SUMMARY OF THE INVENTION

This invention provides a system and a method for assisting a user to accurately skim a document. The system and method of this invention use a variable emphasis attribute to present the text of the document to the user. The more representative a term is of a particular document or portion of a document, the more that term is emphasized in the presentation, as shown in FIG. 2. This technique naturally draws the reader to the more representative terms and, therefore, improves skimming performance. The emphasizing performed by the system and method of this invention is preferably modal to complement a normal reading mode.

There are at least two mechanisms available to the user of the system and method of this invention to control the mode of presentation. One embodiment has a hardware or a software mode switch that toggles the presentation between the reading and scanning modes. Another embodiment allows the user to adjust the dynamic range of the presentation characteristic. Configurations having a high dynamic range are geared more towards skimming while those having a low dynamic range of emphasis increase the readability of the text. A configuration having a low dynamic range sacrifices the ability to discriminate between terms but enhances the readability and also avoids the necessity of switching between a skimming mode and a reading mode. The configuration settings may be incorporated into a user profile to streamline and tailor the system's interactions with each user.

While highlighting has conventionally been used to mark search terms and to retrieve documents, and while that summarization has been used to identify important terms, the two techniques have not been used together to provide a variable emphasis method to support skimming of a document. The variable emphasis of the system and method of this invention provides a mechanism for conveying the relative importance of text in the document or in portions of a document to the reader and to allow the user to more easily detect potentially interesting passages.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
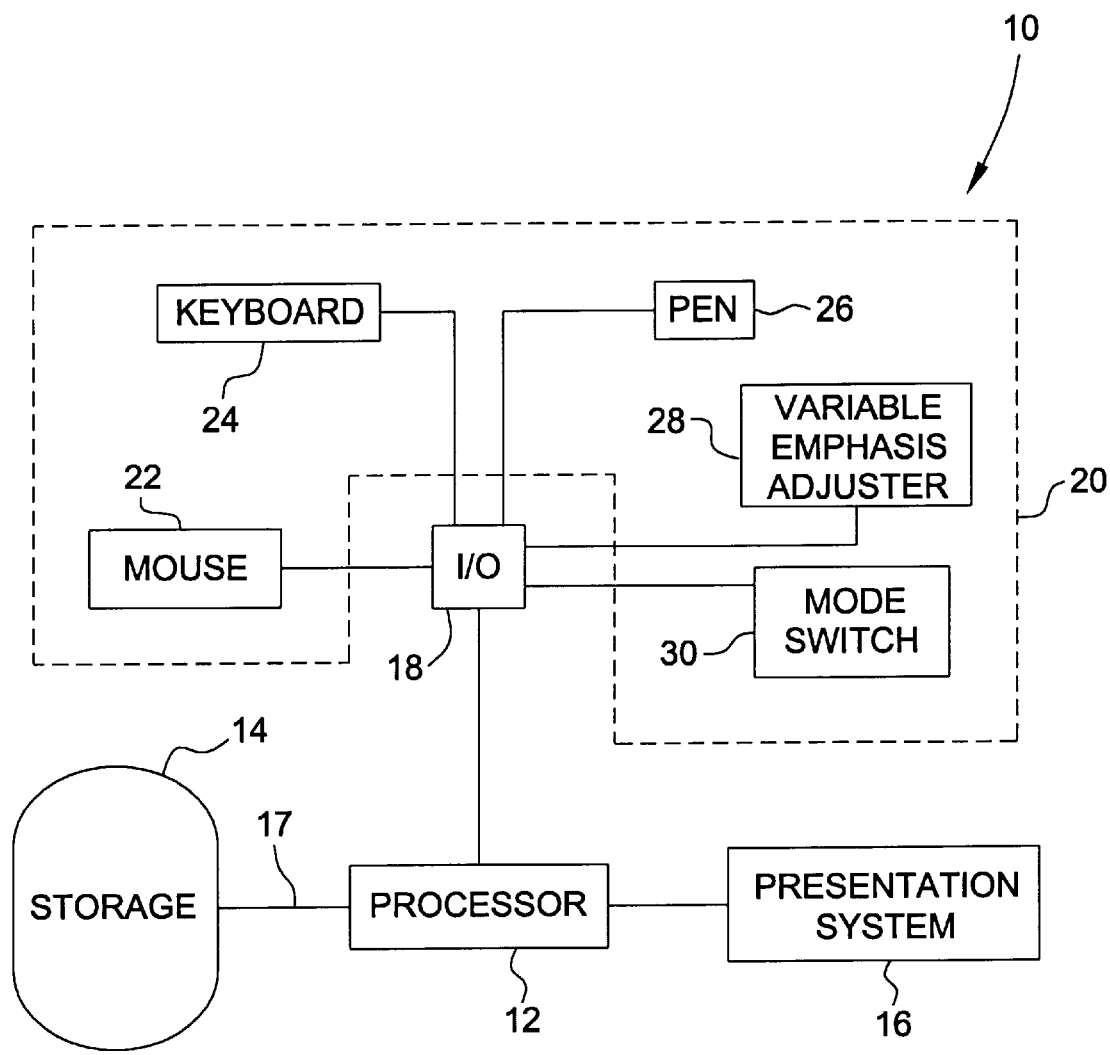
FIG. 1 is a block diagram of one embodiment of the electronic document reading and skimming system of this invention.

FIG. 1 shows a block diagram of one embodiment of the electronic document reading and skimming system 10 of this invention. The electronic document reading and skimming system 10 has a processor 12 communicating with a storage or memory device 14, a presentation system 16 and an input/output interface 18. The storage device 14 stores a document which is presented on the presentation system 16. The presentation system 16 can be any device that is appropriate for the media of the document to be scanned. The presentation system 16 is intended to include, for example, a display such as a CRT or video monitor, an audio system, and the like.

The processor 12 communicates with the input/output interface 18 and receives commands from a user for operating the electronic reading and skimming system 10. The input/output interface 18 communicates with one or more input/output devices 20 that permit a user to control the electronic document reading and skimming system 10. The input/output devices 20 may comprise any number of conventional input/output devices, such as a mouse 22, a keyboard 24 and/or a pen-based interface 26. Additionally, the electronic document reading and skimming system 10 of this invention also has either a variable emphasis adjuster 28 and/or a mode switch 30. The operation of the variable emphasis adjusts 28 and the mode switch 30, generally described as variable emphasis devices, will be described in more detail below.

As shown in FIG. 1, the system 10 is preferably implemented using a programmed general purpose computer. However, the system 10 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowchart shown in FIG. 3 can be used to implement the system 10.

Additionally, as shown in FIG. 1, the storage or memory device 14 is preferably implemented using static or dynamic RAM. However, the storage or memory device 14 can also be implemented using a floppy disk and disk drive, a writable optical disk and disk drive, a hard drive, flash memory or the like. Additionally, it should be appreciated that the storage or memory device 14 can be either distinct portions of a single memory or physically distinct memories.

Further, it should be appreciated that the link 17 connecting the storage or memory device 14 and the processor 12 can be a wired or wireless link to a network (not shown). The network can be a local area network, a wide area network, an intranet, the Internet or any other distributed processing storage network. In this case, the document is pulled from a physically remote storage 14 through the link 17 for processing the processor 12 according to the method outlined below. In this case, the document can be stored locally in a portion of another memory of the system 10 (not shown).

The system 10 analyzes the content of a document to determine the degree to which each term represents the content of an entire document or of portions of a document or to user's model, such as user's selection of documents. This analysis may be done by any number of similarity, relatedness or relevance algorithms. One specific example of a relatedness algorithm is explained in detail below. However, it is intended to be understood that any similarity, relatedness or relevance algorithm that is in existence or will be in existence is intended to be understood as being an appropriate algorithm for the present invention.

In one embodiment of the system and method of this invention, the degree with which a term represents a full document is assessed by a term frequency and inverse document frequency product (TF*IDF). Scores derived from the term frequency and inverse document frequency product are subsequently mapped onto a variable emphasis attribute.

The inverse document frequency (IDF) measures the extent to which a word can discriminate among the documents in a collection. The more representative a term is of a particular document, the higher that term's idf score. The inverse document frequency of a term can be defined as:

$$IDF_w = \log\left(\frac{N}{n_w}\right) \quad (1)$$

where:
IDF$_w$ is the inverse document frequency of the term;
N is the number of documents in a database; and
n$_w$ is the number of documents containing the given term.

The term frequency (TF) of a term w in a document d may be defined as:

$$TF_{w,d} = \frac{f_{w,d}}{t_d} \quad (2)$$

where:
TF$_{w,d}$ is the term frequency of a term w in a document d;

$f_{w,d}$ is the number of times the term w appears in the document d; and $t_d$ is the number of terms in the document d, excluding all of the stop words.

Stop words are the frequently occurring words of the English language that do not provide any meaningful distinction between documents when analyzed. Examples of common stop words include: "the", "a", "at", "is", "it", "are", etc.

The TF*IDF product measures the degree to which a given term uniquely represents a given document. The TF*IDF product ranges from 0 when the term w is not found in the document d or when it is found in all documents, to log(N), when the term w is found only in the document d and the document only contains the term w. For some purposes the TF*IDF product may be normalized by dividing it by the highest score.

The TF*IDF product is appropriate for estimating the usefulness of terms drawn from a document without a sample bias. In some cases, however, it is important to take into account a user's selection of documents so that a higher emphasis is assigned to terms that are important to a given user at a given time. For example, a collection of document segments of interest to a user may be used as a source of important key words. In this example the collection of document segments are used to bias the scores to favor those documents that include the document segments included in the collection. This biasing causes the system to emphasize the test that is related to the topic of the collection.

This approach, however, will not work if a user selects passages reflecting the user's interest that contain multiple similar terms. In fact, the TF*IDF product, divided by the number of selected passages or documents, may produce low scores for precisely those words in which the user is interested. In such cases, a term's idf score may be replaced by its relative document frequency (RDF), defined as:

$$RDF_w = \log\left(\frac{f'_w}{f_w}\right) \quad (3)$$

where:

$RDF_w$ is the relative document frequency of a term w;

$f_w$ is the fraction of the documents of the full collection that contain the term w; and $f'_w$ is the fraction of the documents in a user's sample that contain the same term.

The appropriate relatedness factor, TF*IDF or TF*RDF, can be applied to the text of the document being skimmed by mapping it onto the variable emphasis attribute of, for example, a font (e.g., boldness, color, etc.). For proportional width fonts, color is a natural attribute choice because color will not cause the lines of the document to be reformatted. It should be understood that the process is analogous for other variable emphasis attributes. It should also be understood that the term "variable emphasis attribute" is intended to include any attribute of a presentation that can emphasize some portions of text over other portions of text. For example, the RSVP system may incorporate the features of this invention by increasing the display time to increase the emphasis of the more representative text. Multimedia documents or audio documents can vary the emphasis by varying the volume, speed, pitch, frequency or other controllable feature of the presentation. Any attribute of any presentation method is appropriate as a variable emphasis attribute as long as the attribute can emphasize some portion of the document over other portions.

Figure 2:
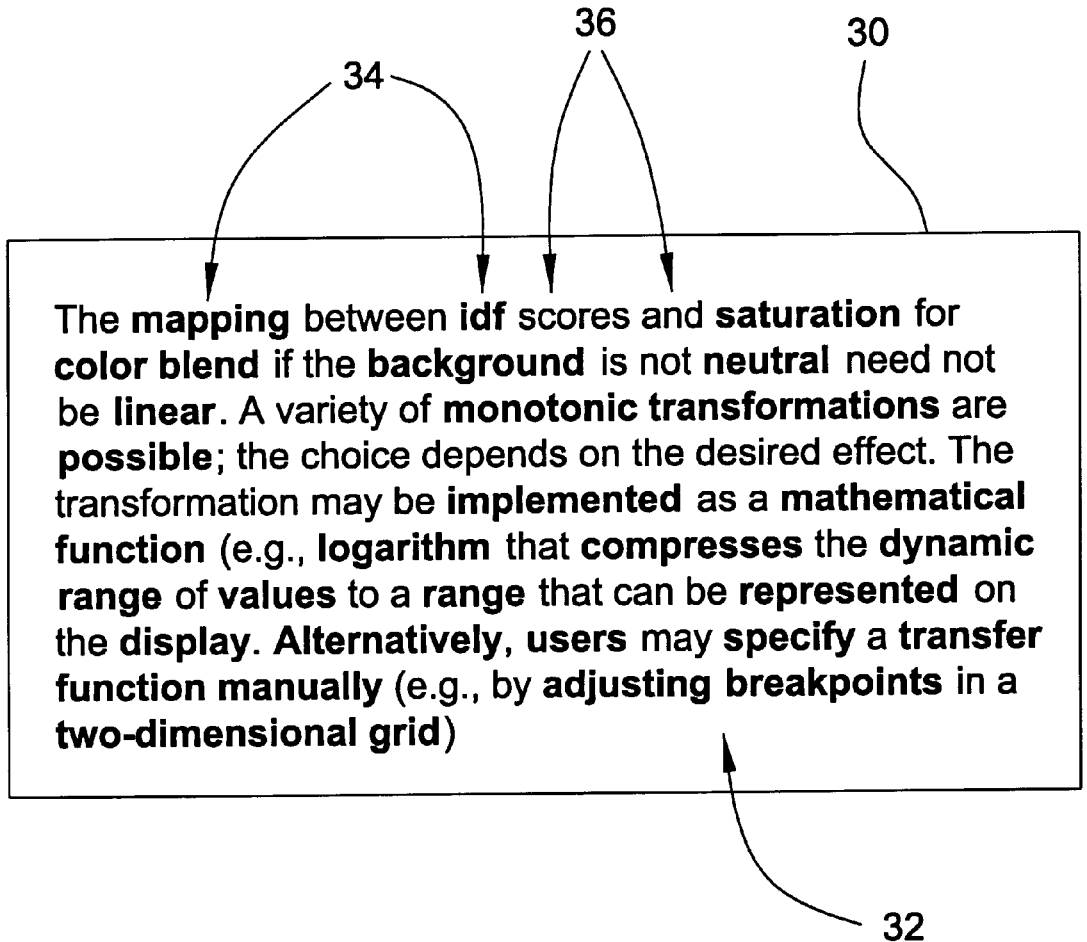
FIG. 2 shows a document in a variable emphasis font as the variable emphasis attribute in accordance with this invention.

FIG. 2 shows a display 30 presenting a document 32 using a variable emphasis attribute in accordance with the method and system of this invention. In particular, display 30 uses the boldness of the font as the variable emphasis attribute. The terms 34 more closely represent the overall content of the document 32 than the terms 36. Therefore, the terms 34 are emphasized more than the terms 36 by displaying the terms 34 in a bolder font than the terms 36.

Figure 3:
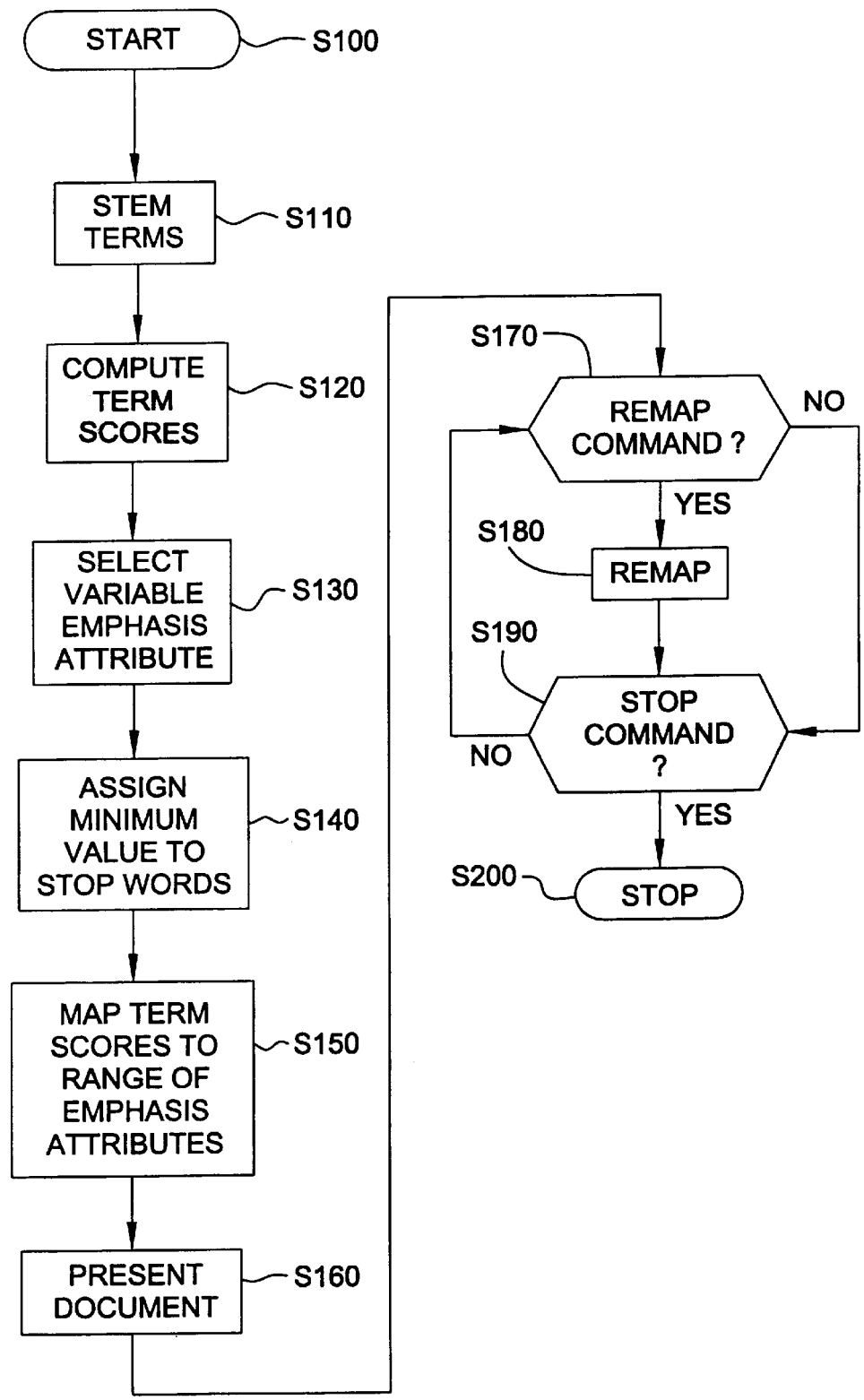
FIG. 3 is a flow chart outlining the control routine of one embodiment of this invention.

FIG. 3 is a flow chart outlining one preferred control routine of the electronic document reading and scanning system of this invention. The control routine starts at step S100 and proceeds to step S110, where the terms of a document are stemmed or reduced to canonical form. Stemming is performed using stemming algorithms that are designed to conflate plurals, tenses, etc. After these terms are stemmed in step S110, the control routine continues to step S120.

In step S120, the term scores are computed for the document to be presented. Next, in step S130, the control routine selects a variable emphasis attribute to indicate the relatedness of the terms, either automatically or based upon a user-selected emphasis characteristic. Then, in step S140, a minimum value for the emphasis attribute is assigned to the stop words. Next, in step S150, the control routine maps the term scores to the range of the selected variable emphasis attribute.

In step S160, the control routine presents the various terms of the document with the assigned values of the variable emphasis attribute, as shown in FIG. 2. After the document is presented, the control routine continues to step S170. In step S170, the control routine determines if the user has input a command to remap the term frequency scores either to a different variable emphasis attribute or to shift the term frequency scores on the range of values of the variable emphasis attribute. In step S170, if the control routine determines that a remap command has been received, the control routine continues to step S180. Otherwise, control jumps to step S190. In step S180, the control system remaps the variable emphasis attribute based on the received remap command. Control then continues to step S190. In step S190, the control routine determines if a stop command has been entered by the user. If so, the control routine continues to step S200, where the control routine stops. Otherwise, control jumps back to step S170.

The remap command may be input into the electronic document reading and scanning system 10 by adjusting either the variable emphasis adjuster 28 or by pressing the mode switch 30. The variable emphasis adjuster 28 allows the dynamic range of the emphasis attribute to be adjusted. In other words, an adjustment of the variable emphasis adjuster 28 remaps the range of the term frequency scores either up or down the range of values of the variable emphasis attribute. Simple examples include a volume knob on a sound system for presentation of an audio document or a knob on a personal document reader that adjusts the contrast of the displayed text. Such dynamic control over the emphasis may be provided by, for example, a knob, a slider, a Graphical User Interface, a physical contact strip. Any variable emphasis adjuster is intended if it is a hardware or software element that permits dynamic control over the mapping of term-scores to a variable emphasis attribute. The mapping also is intended to include mapping of any number of dimensions as long as the mapping algorithm produces ranked and/or ordered terms.

The mode switch 30 toggles the presentation output to the presentation device between the skim mode and the reading mode. In the skim mode, the term frequency scores are mapped to the range of values of the variable emphasis attribute. In the reading mode, the term frequency scores are remapped to the maximum value of the variable emphasis attribute. Alternatively, in the reading mode the variable emphasis attribute is overridden and the document is displayed normally. Therefore, the system and method of this invention provide for quickly adjusting the relative emphasis of the presentation of the various terms of the document and/or also quickly permit toggling between the skimming and the reading modes.

The lower limit of the range of the variable emphasis attribute range will vary depending on the presentation characteristics and on any enabled user preferences. If color is selected as the variable emphasis attribute of a font, the color range used to variably display the terms of a document preferably is a varying blend of the foreground and background colors. When the background color is white, varying the saturation will achieve the desired affect.

For some applications, common words may be suppressed entirely by setting the lower values of the score distribution to the background color. This will cause common words to be suppressed in the display, and only a pattern of the more characteristic terms as they are distributed in the document. Alternatively, terms with the lowest score can be displayed as a pale shade of the foreground color. For terms with higher scores, a more saturated hue can be used.

Mapping between scores and the variable emphasis attribute values, such as saturation (or color blend if the background is not neutral) when color is used as the variable emphasis attribute, need not be linear. A variety of monotonic transformations are possible. The choice of a transformation depends on the desired affect. The transformation can be implemented as a mathematical function, such as, for example, a logarithmic scale that compresses the dynamic range of the score values to a range of the variable emphasis attributes that can be represented. Alternatively, users may specify the mapping manually, for example, by adjusting grade points in a two-dimensional grid. The scores may also be mapped to multiple dimensions such as, for example, boldness for TF*IDF and fade to RDF.

Figure 4:
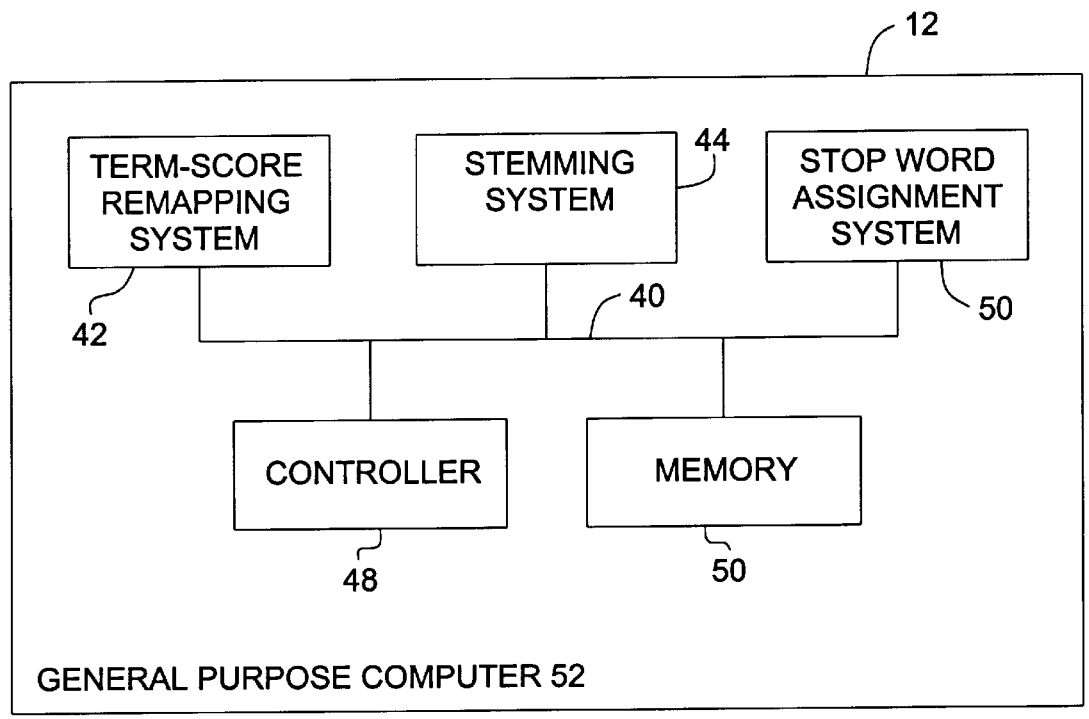
FIG. 4 is a block diagram of one embodiment of a processor of this invention.

FIG. 4 shows a block diagram of one embodiment of the processor 12 of this invention. The processor 12 is preferably implemented using a general purpose computer 52. The general purpose computer 52 preferably includes a controller 48, a memory 50, a term-score remapping system 42, a stemming system 44 and a stop word assignment system 46. The elements of the general purpose computer 52 are interconnected by a bus 40. The term-score remapping system 42, the stemming system 44, the stop word assignment system 46 and the memory 50, controlled by the controller 48, are used to implement the flow chart shown in FIG. 3. It should be appreciated that the term-score remapping system 42, the stemming system 44 and the stop word assignment system 46 are preferably implemented as software routines running on the controller 48 and stored in the memory 50. It should also be appreciated that many other implementations of these elements will be apparent to those skilled in the art.

While the above description describes an embodiment of this invention that uses a relatedness factor TF*IDF or TF*RDF, it should be understood that any relatedness factor that measures the degree with which a term represents the full content of a document is included in the definition of "term-score". For example, term-score is also intended to include the term frequency metric (TF), in which case no collection of documents is required.

It should be understood that the term "document" is intended to include text, audio, video and any other information storing file and any combination of information storing files. Further, it should be understood that the term "text" is intended to include text, digital ink, audio, audio bars, video or any other content of a document, including a document's structure. It should also be understood that the term "display" is intended to include any type of presentation device appropriate for the type of text in the document.

While the above description of the preferred embodiments refer to the calculation of IDF, RDF, etc., it should be understood that this invention includes using any approach that can indicate the degree to which a portion of a document's content and/or structure reflects the overall content of the document. It should further be understood that the term "terms" is intended to include any divisible structure of a document such as, for example, words, sentences, phrases, paragraphs, sections, pages and any other distinguishable portion of a document.

While this invention has been described with the specific embodiments outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A method for facilitating skimming by a user of a document presented on a presentation device using at least one variable emphasis attribute having at least three values, the document having a plurality of terms, the method comprising:

determining a term-score for each of the plurality of terms;

mapping the term-score for each of the plurality of terms onto one of the at least three values of the at least one variable emphasis attribute; and presenting to the user each of the plurality of terms of the document using the mapped values of the at least one variable emphasis attribute.

2. The method of claim 1, wherein the term-score represents the degree to which each of the plurality of terms represents the overall content of the document.

3. The method of claim 1, wherein the term-score is a product of a frequency of the term in the document and an inverse document frequency of the term in a set of documents including the presented document.

4. The method of claim 1, wherein the term-score is a term frequency.

5. The method of claim 1, wherein the term-score is a relative document frequency.

6. The method of claim 1, wherein the at least one variable emphasis attribute is at least one of color, font, font boldness, font width, length of presentation, volume, speed, pitch and frequency.

7. The method of claim 1, further comprising:

receiving a command to remap the term-score from a user;

remapping the term-scores to a different range of the at least one variable emphasis attribute in response to receiving the remap command; and re-presenting the document.

8. The method of claim 1, further comprising converting the plurality of terms into canonical form prior to determining the term-score.

9. The method of claim 1, further comprising assigning a predetermined value of the at least one variable emphasis attribute to stop words.

10. The method of claim 1, further comprising the step of presenting the document in a constant value of the at least one variable emphasis attribute.

11. The method of claim 1, wherein the term-score is biased.

12. The method of claim 11, wherein the term-score is biased based on identified document segments.

13. An apparatus for facilitating skimming of a document by a user, the document having a plurality of terms, the apparatus comprising:

a processing system that determines a term-score for each of the plurality of terms and that maps the term-score of each of the plurality of terms onto one of at least three values of at least one variable emphasis attribute usable to present the document; and a presentation system that presents each of the plurality of terms of the document using the corresponding mapped values of the at least one variable emphasis attribute.

14. The apparatus of claim 13, wherein the term-score represents the degree to which each of the plurality of terms represents the overall content of the document.

15. The apparatus of claim 13, wherein the term-score is a product of a frequency of the term in the document and an inverse document frequency of the term in a set of documents including the displayed documents.

16. The apparatus of claim 13, wherein the term-score is the term frequency.

17. The apparatus of claim 13, wherein the term-score is a relative document frequency.

18. The apparatus of claim 13, wherein the at least one variable emphasis attribute is at least one of a color, font, boldness, width, length of presentation, volume, speed, pitch and frequency.

19. The apparatus of claim 13, further comprising a variable emphasis adjuster.

20. The apparatus of claim 19, wherein the processing system comprises a term-score remapping system that remaps the term-score for each term in response to an adjustment of the variable emphasis adjuster by a user of the apparatus.

21. The apparatus of claim 13, wherein the processing system further comprises a canonicalizing system that converts the plurality of terms into canonical form.

22. The apparatus of claim 13, wherein the processing system further comprises a stop word assignment system that assigns a minimum value of the at least one variable emphasis attribute to stop words.

23. The apparatus of claim 13, further comprising a mode switch.

24. The apparatus of claim 23, wherein the processing system comprises a term-score remapping system that remaps the term-score for each term based on a state of the mode switch.

25. The apparatus of claim 24, wherein the term-score remapping system remaps the term-scores for each term to a single value of the at least one variable emphasis attribute in response to the state of the mode switch.

26. The apparatus of claim 13, wherein the term-score is biased.

27. The apparatus of claim 26, wherein the term-score is biased based on identified document segments.

28. A graphical user interface for facilitating skimming by a user of a document, the document having a plurality of terms, the interface comprising:

a processor that determines a term-score for each of the plurality of terms;

a mapper that maps the term-score for each of the plurality of terms onto one of at least three values of at least one variable emphasis attribute;

a display that displays at least one of the plurality of terms of the document using the mapped values of the at least one variable emphasis attribute; and a variable emphasis adjuster that is responsive to an adjustment by a user to remap the term-score for each of the plurality at terms onto one of the at least three values of the at least one variable emphasis attribute in accordance with the adjustment, wherein the display is responsive to the adjustment to redisplay at least one of the plurality of terms in accordance with the remapped values.

* * * * *